(12) United States Patent
Lu et al.

(10) Patent No.: US 11,099,416 B2
(45) Date of Patent: Aug. 24, 2021

(54) LIQUID CRYSTAL DISPLAY PANEL WITH NARROW BEZEL

(71) Applicant: HON HAI PRECISION INDUSTRY CO., LTD., New Taipei (TW)

(72) Inventors: I-Min Lu, New Taipei (TW); Kuo-Sheng Lee, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/685,871

(22) Filed: Nov. 15, 2019

(65) Prior Publication Data

US 2021/0124208 A1  Apr. 29, 2021

(30) Foreign Application Priority Data

Oct. 25, 2019 (CN) .......................... 201911024114.9

(51) Int. Cl.
*G02F 1/1333* (2006.01)
*G02F 1/1339* (2006.01)

(52) U.S. Cl.
CPC .... *G02F 1/133308* (2013.01); *G02F 1/13394* (2013.01); *G02F 1/133305* (2013.01)

(58) Field of Classification Search
CPC ............. G02F 1/1333; G02F 1/133308; G02F 1/133305; G02F 1/13394; H01L 21/50

USPC .................................................. 349/149–152
See application file for complete search history.

(56) References Cited

U.S. PATENT DOCUMENTS

| 2002/0027636 | A1* | 3/2002 | Yamada ............ G02F 1/133305 349/155 |
| 2010/0253902 | A1* | 10/2010 | Yamazaki ........... H01L 27/1218 349/158 |
| 2014/0126228 | A1* | 5/2014 | Lee ......................... F21V 21/00 362/382 |
| 2017/0083148 | A1 | 3/2017 | Ahn et al. |
| 2018/0259805 | A1* | 9/2018 | Takehara .......... G02F 1/136209 |
| 2019/0033652 | A1* | 1/2019 | Sano ................. G02F 1/133512 |
| 2019/0302529 | A1 | 10/2019 | Zha et al. |
| 2020/0042125 | A1* | 2/2020 | Lee ....................... G06F 3/0412 |

* cited by examiner

*Primary Examiner* — Charles S Chang
(74) *Attorney, Agent, or Firm* — ScienBiziP, P.C.

(57) ABSTRACT

An LCD display panel with increased screen-to-body ratio includes first and second substrates with a liquid crystal layer disposed between them. The first substrate includes a display portion and at least two edge portions. The second substrate includes a support portion, two extended portions, and a second extended portion. A size of the support portion is same as a size of the display portion. Each first extended portion corresponds to one edge portion. The second extended portion is extended from a side of the support portion and is bent away from the first substrate. Part of the second extended portion is disposed below the display portion, and the electronic elements to drive the display are disposed on surface of the second extended portion.

10 Claims, 7 Drawing Sheets

LIQUID CRYSTAL DISPLAY PANEL WITH NARROW BEZEL

FIELD

The subject matter herein generally relates to liquid crystal display panel with narrow bezel.

BACKGROUND

Liquid Crystal Display (LCD) panel is widely used. The LCD panel includes an outer lead bonding (OLB) region in a non-display region. Due to the OLB region, it is very difficult to achieve an LCD panel with the narrow bezel.

There is room for improvement in the art.

BRIEF DESCRIPTION OF THE FIGURES

Implementations of the present disclosure will be described, by way of embodiment, with reference to the figures.

DETAILED DESCRIPTION

Figure 1:
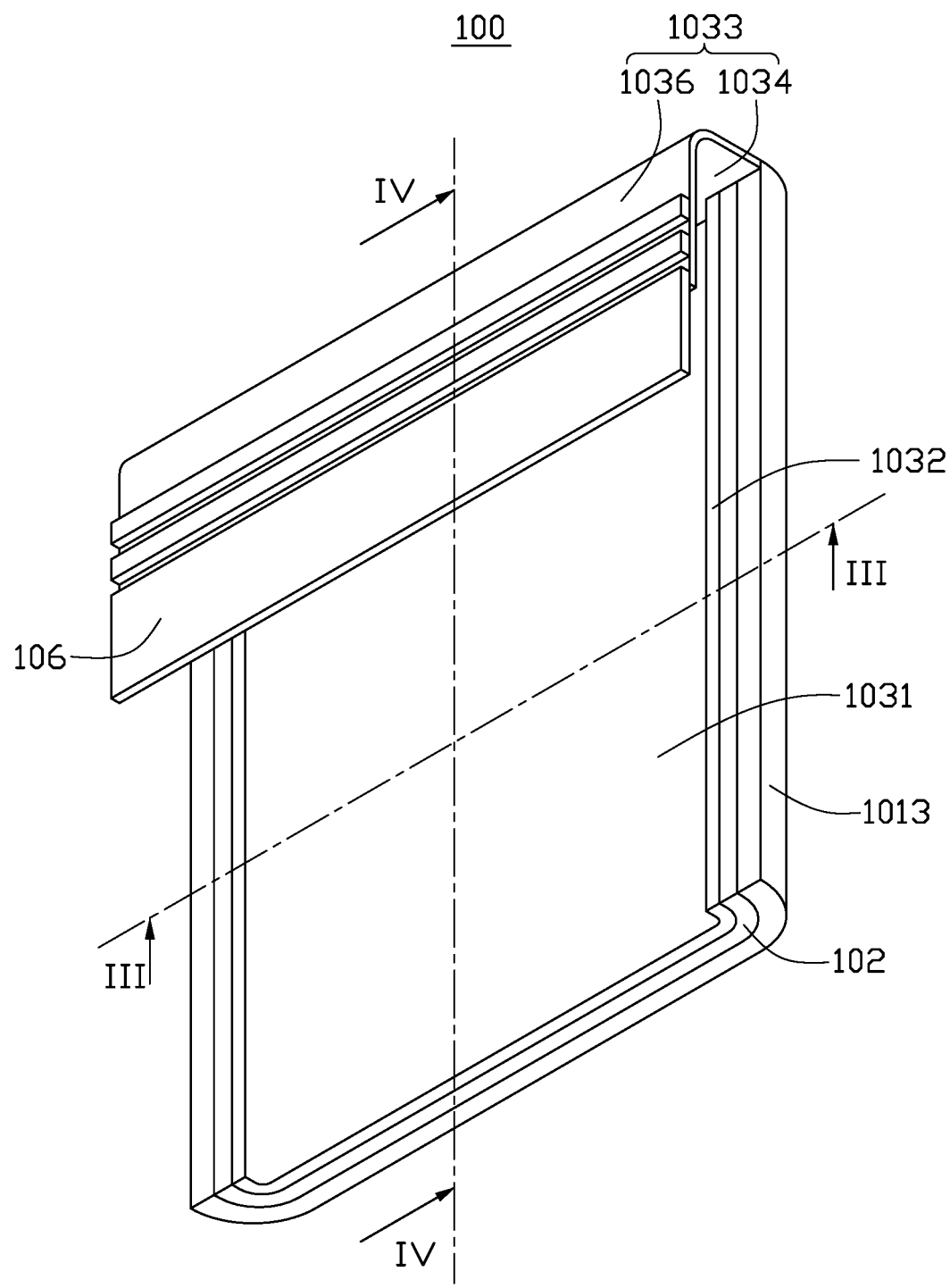
FIG. 1 is a schematic view of a first embodiment of an LCD panel.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "substantially" is defined to be essentially conforming to the particular dimension, shape, or other feature that the term modifies, such that the component need not be exact. For example, "substantially cylindrical" means that the object resembles a cylinder but can have one or more deviations from a true cylinder. In general, the word "module," as used herein, refers to logic embodied in hardware or firmware, or to a collection of software instructions, written in a programming language, for example, Java, C, or assembly. One or more software instructions in the modules may be embedded in firmware, such as an EPROM, magnetic, or optical drives. It will be appreciated that modules may comprise connected logic units, such as gates and flip-flops, and may comprise programmable units, such as programmable gate arrays or processors, such as a CPU. The modules described herein may be implemented as either software and/or hardware modules and may be stored in any type of computer-readable medium or other computer storage systems. The term "comprising" means "including, but not necessarily limited to"; it specifically indicates open-ended inclusion or membership in a so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one." Embodiments of the present disclosure are described with reference to the drawings.

The present disclosure describes an LCD panel with a narrow bezel.

FIG. 1 shows a first embodiment of a liquid crystal display (LCD) panel 100. The LCD panel 100 is used in an electronic device with LCD panel, such as, mobile phone, tablet, personal digital assistant (PDA), games machine, automobile instrument, or wearable device, not being limited.

Figure 2:
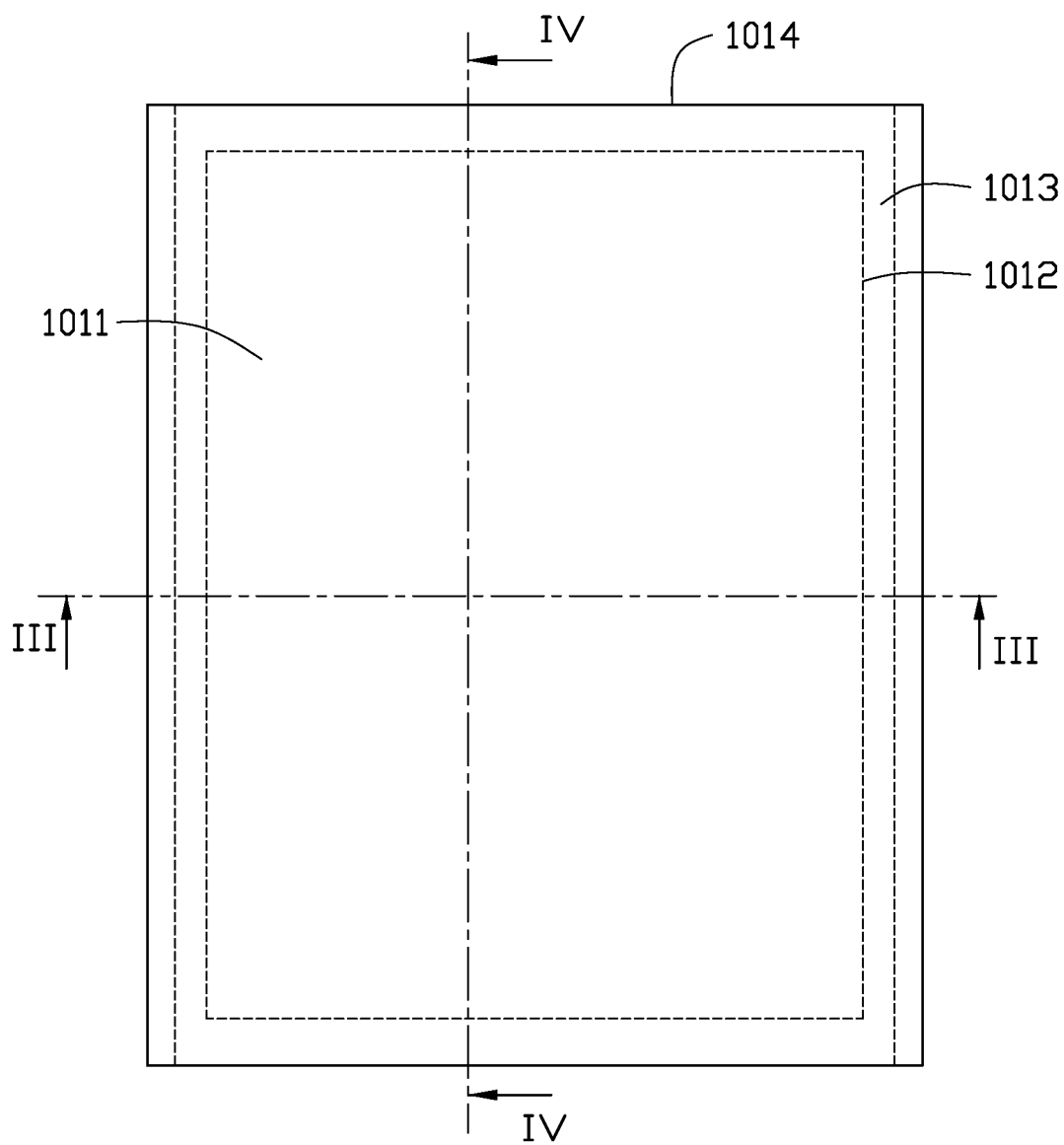
FIG. 2 is a planar view of the LCD panel of FIG. 1.
Figure 3:
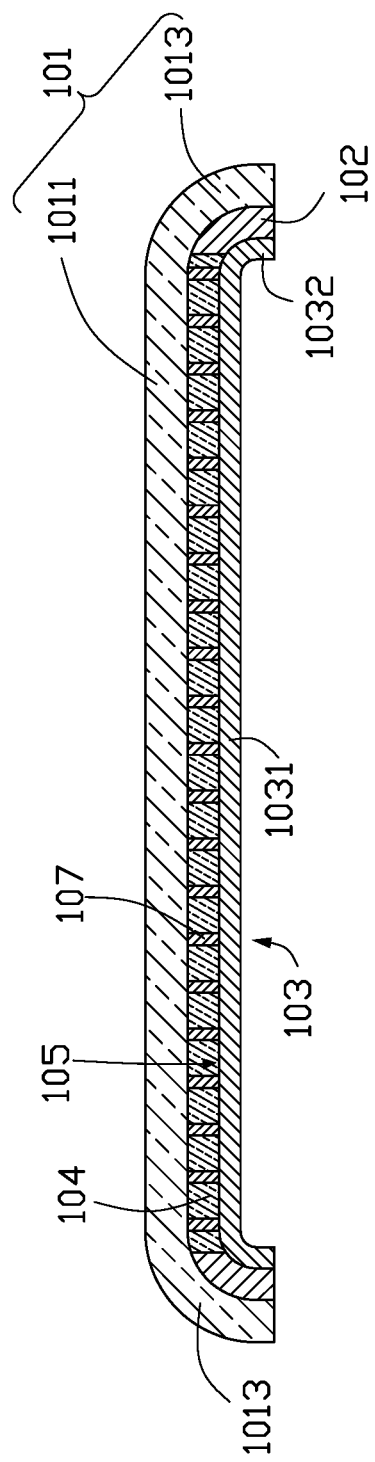
FIG. 3 is a cross-sectional view along line of FIG. 1.
Figure 4:
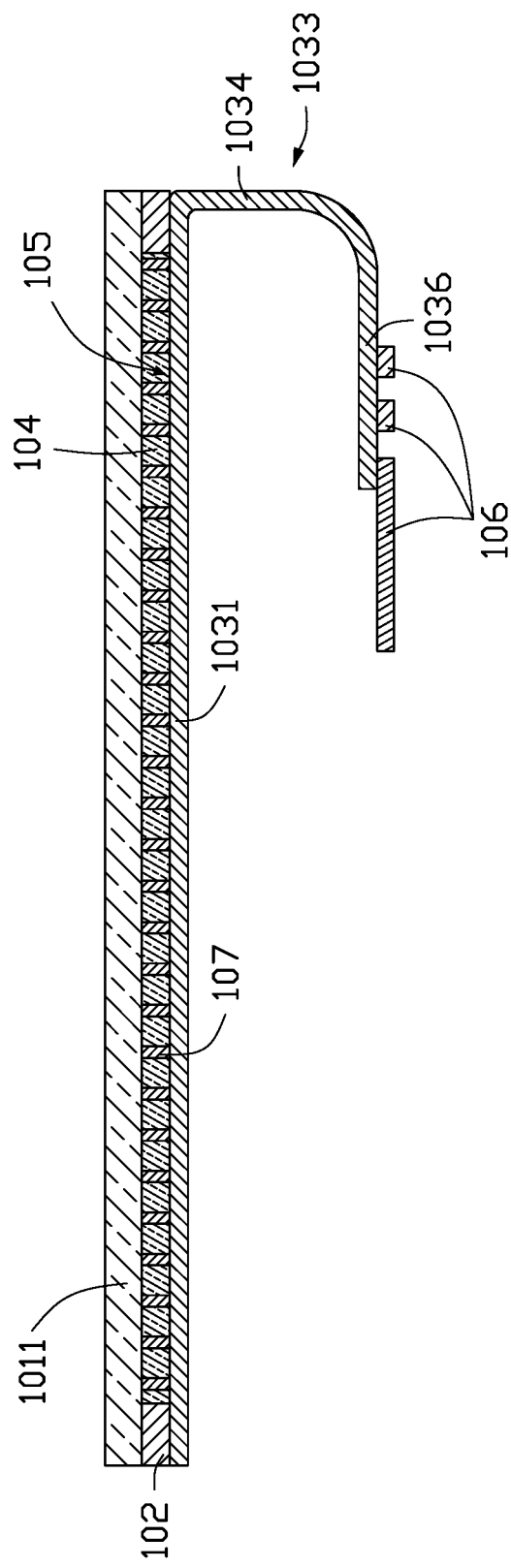
FIG. 4 is a cross-sectional view along line IV-IV of FIG. 1, showing a second substrate.

FIGS. 2-4 show planar and cross-sectional views taken along lines and IV-IV of the LCD panel 100.

The LCD panel 100 includes a first substrate 101, a second substrate 103 opposite to the first substrate 101, a sealing portion 102, a liquid crystal layer 105, and spacers 107.

The first substrate 101 is made of transparent material, and seals against dust and other impurities. The first substrate 101 is made of transparent material. In one embodiment, the first substrate 101 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. In one embodiment, the first substrate 101 is a cover glass. In other embodiments, the first substrate 101 can be a color filter (CF) glass. The first substrate 101 includes a display portion 1011 and at least two edges portions 1013. The display portion 1011 serves as a display region of the LCD panel 100. The display portion 1011 includes two first edges 1012 and two second edges 1014. The first edges 1012 are opposite each other, and the second edges 1014 are opposite each other. The first edge 1012 is adjacent to the second edge 1014. In one embodiment, the display portion 1011 is substantially in a rectangle shape. The first edges 1012 are long sides of the rectangle display portion 1011, and the second edges 1014 are short sides of the rectangular display portion 1011. In one embodiment, the first substrate 101 includes two edge portions 1013. The edge portions 1013 are extended and bent from the first edges 1012 to the second substrate 103. The edge portions 1013 serve as a non-display region of the LCD panel 100. In other embodiments, the first substrate 101 includes three edge portions 1013. Two of the edge portions 1013 are extended and bent from the first edges 1012 to the second substrate 103, and the other edge portion 1013 is extended and bent from one of the second edges 1014 to the second substrate 103.

The sealing portion 102 is disposed between the first substrate 101 and the second substrate 103 and corresponds to edges of the first substrate 101 and the second substrate 103. The sealing portion 102 is substantially frame-shaped. The sealing portion 102 seals and bonds the first substrate 101 and the second substrate 103 together and forms a space 104 between the first substrate 101 and the second substrate 103. In one embodiment, the sealing portion 102 is an adhesive layer.

The second substrate 103 is flexible, for reducing a thickness and a weight of the LCD panel 100. In one embodiment, the second substrate 103 is a polyimide film (PI).

The liquid crystal layer 105 is sandwiched between the first substrate 101 and the second substrate 103 and is received in the space 104. The liquid crystal layer 105 includes a plurality of liquid crystals (not shown). The liquid crystal layer 105 is surrounded by the sealing portion 102.

The spacers 107 are disposed between the first substrate 101 and the second substrate 103 and are received in the space 104. The spacers 107 are arranged in a matrix. The spacers 107 maintain a certain distance between the first substrate 101 and the second substrate 103 and provide uniform support to the first substrate 101.

The second substrate 103 further includes a support portion 1031, two first extended portions 1032, and a second extended portion 1033 (as shown in FIG. 4). The support portion 1031 is provided opposite to the first substrate 101 and is completely overlapped with the first substrate 101. The support portion 1031 is substantially in a rectangular shape. The first extended portions 1032 are extended from two sides of the support portion 1031 facing the edge portion 1013 and are bent away from the first substrate 101. In a light emitting direction, the first extended portions 1031 is disposed below the edge portions 1013. The first extended portions 1032 and the edge portions 1013 are bent along a same direction and have a same radius of curvature. The sealing portion 102 can be disposed between the edge portion 1013 and the first extended portion 1032 for reducing an area of the non-display region on the light emitting direction, thus a screen-to-body ratio of the LCD panel 100 is increased and improved. The second extended portion 1033 is extended from another side of the support portion 1031 and bent away from the first substrate 101. The second extended portion 1033 includes a first bent portion 1034 and a second bent portion 1036. The first bent portion 1034 is extended from another side of the support portion 1031 and bent away from the first substrate 101. In one embodiment, the first bent portion 1034 is perpendicular to the support portion 1031. The second bent portion 1036 is extended from an end of the first bent portion 1034 facing away from the support portion 1031 and is parallel with the support portion 1031. The second bent portion 1036 is disposed below the support portion 1031. Electronic elements 106 are disposed on a surface of the second bent portion 1036 facing away from the support portion 1031. Thus, the positions of the electronic elements 106 do not affect the screen-to-body ratio of the LCD panel 100. Projections of the electronic elements 106 along the light emitting direction are in the display region, and the electronic elements 106 are not coplanar with the display portion 1011. In one embodiment, the electronic elements 106 can include an integrated circuit, a chip on flex (COF), a resistor, or a capacitor, not being limited. In other embodiments, some of the electronic elements 106 can be disposed between the first extended portion 1032 and the edge portion 1013.

Figure 5:
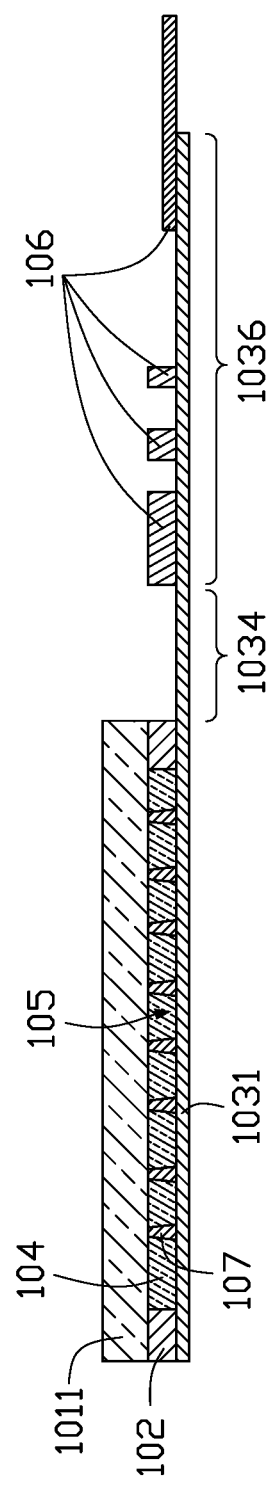
FIG. 5 is a cross-sectional view of the LCD panel of FIG. 4 before bending the second substrate.

FIG. 5 shows the second substrate 103 before bending. In a manufacturing process, the plate-shaped second substrate 103 is pasted on the first substrate 101. Then, the first extended portions 1032 and the second extended portion 1033 are bent, thus the first bent portion 1034 is perpendicular to the support portion 1031, and the second bent portion 1036 is disposed below the support portion 1031.

Figure 6:
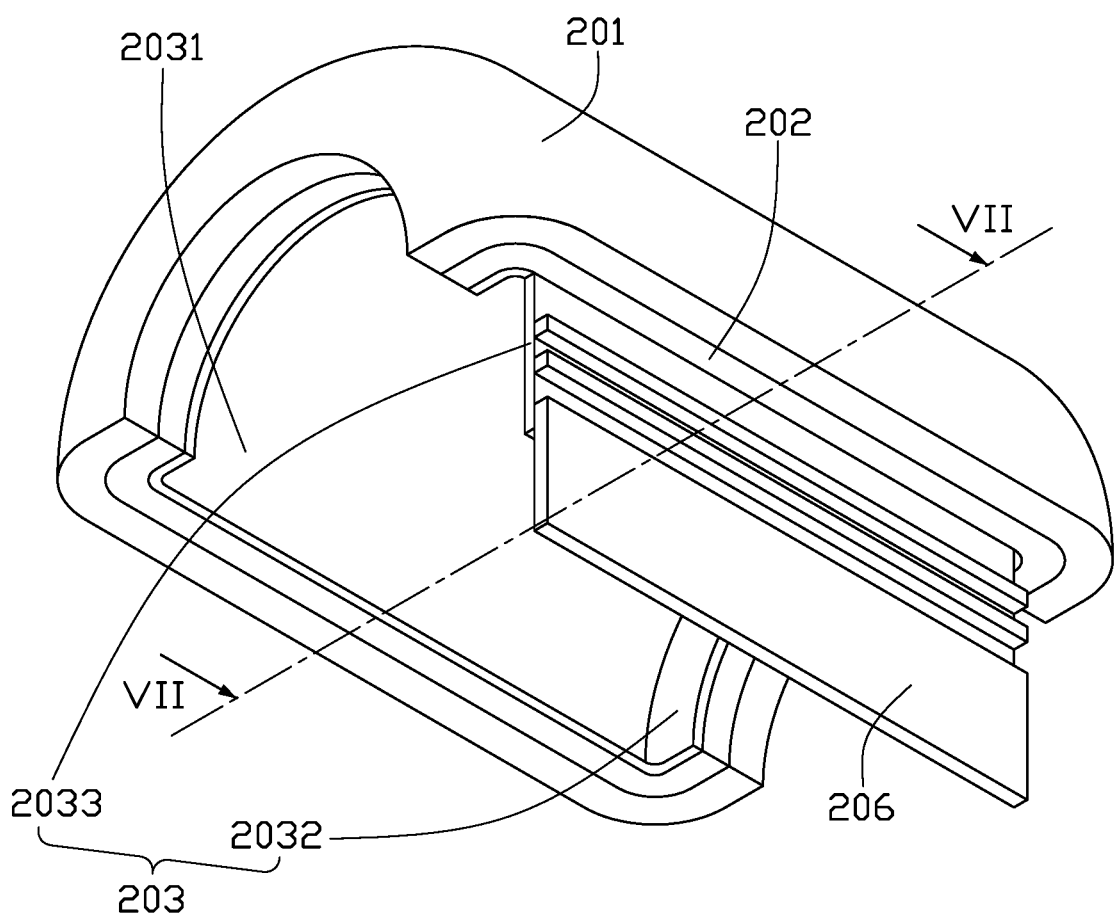
FIG. 6 is a schematic view of a second embodiment of an LCD panel.
Figure 7:
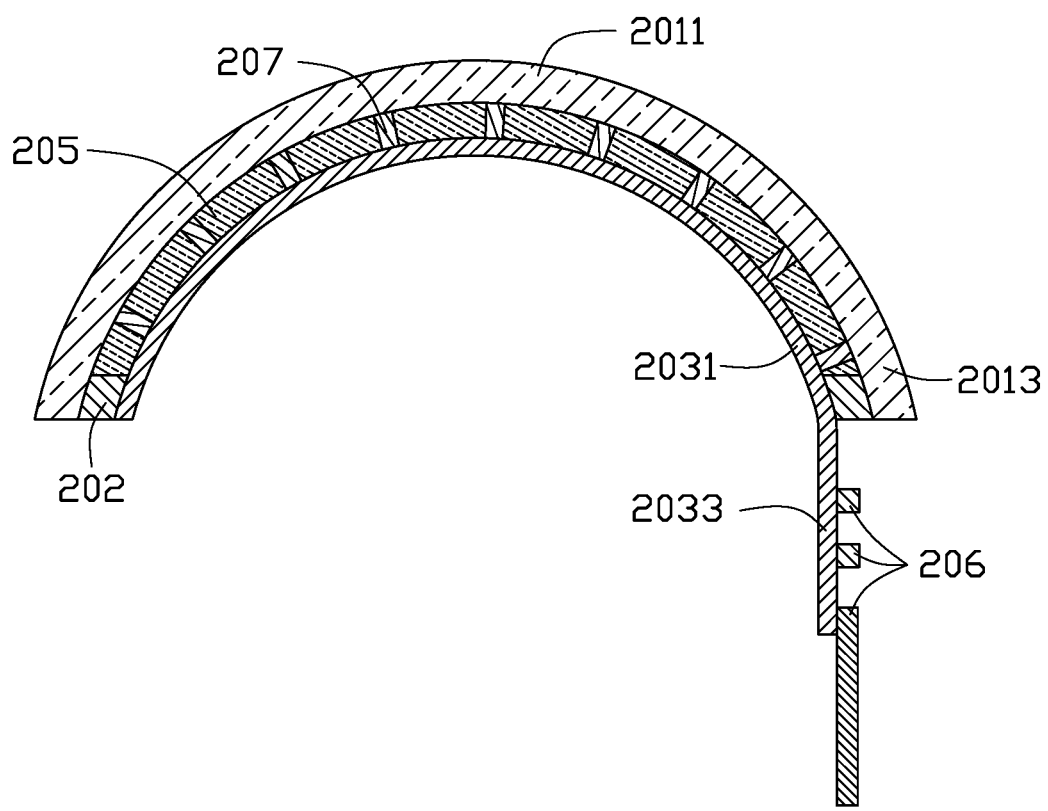
FIG. 7 is a cross-sectional view along line VII-VII of FIG. 1.

FIGS. 6 and 7 show a second embodiment of the LCD panel 200.

The LCD panel 200 includes a first substrate 201, a second substrate 203 opposite to the first substrate 201, a sealing portion 202, a liquid crystal layer 205, and spacers 207.

The first substrate 201 is made of transparent material, and seals against dust and other impurities. The first substrate 201 is made of transparent material. In one embodiment, the first substrate 201 can be made of, for example, transparent glass, quartz, or plastic. Suitable materials for the transparent substrate comprise, for example, polycarbonate (PC), polyethylene terephthalate (PET), polymethylmethacrylate, (PMMA), cyclic olefin copolymer (COC), or polyethersulfone (PES), or combinations thereof. In one embodiment, the first substrate 201 is a cover glass. In other embodiments, the first substrate 201 can be a color filter (CF) glass. The first substrate 201 is a curved structure. The first substrate 201 includes a display portion 2011 and at least two edges portions 2013. The display portion 2011 serves as a display region of the LCD panel 200. The display portion is a curved structure. In one embodiment, the first substrate 201 includes two edge portions 2013. The edge portions 2013 serve as a non-display region of the LCD panel 200. In other embodiments, the first substrate 201 includes three edge portions 2013.

The sealing portion 202 is disposed between the first substrate 201 and the second substrate 203 and corresponds to edges of the first substrate 201 and the second substrate 203. The sealing portion 202 is substantially frame-shaped. The sealing portion 202 seals and bonds the first substrate 201 and the second substrate 203 together and forms a space (not shown) between the first substrate 201 and the second substrate 203. In one embodiment, the sealing portion 202 is an adhesive layer.

The second substrate 203 is flexible, for reducing a thickness and a weight of the LCD panel 200. In one embodiment, the second substrate 203 is a polyimide film (PI).

The liquid crystal layer 205 is sandwiched between the first substrate 201 and the second substrate 203 and is received in the space 204. The liquid crystal layer 205 includes a plurality of liquid crystals (not shown). The liquid crystal layer 205 is surrounded by the sealing portion 202.

The spacers 207 are received in the space between the first substrate 201 and the second substrate 203. The spacers 207 are arranged in a matrix. The spacers 207 maintain a certain distance between the first substrate 201 and the second substrate 203 and provide uniform support to the first substrate 201.

The second substrate 203 further includes a support portion 2031, two first extended portions 2032, and a second extended portion 2033 (as shown in FIG. 7). The support portion 2031 is opposite to the first substrate 201. The support portion 2031 is a curved structure. The support portion 2031 and the display portion 2011 are bent along a same direction and have a same radius of curvature. The first extended portions 2032 are extended from two sides of the support portion 2031 facing the edge portion 2013 and are bent away from the first substrate 201. In a light emitting direction, the first extended portions 2031 are disposed below the edge portions 2013. The first extended portions 2032 and the edge portions 2013 are bent along a same direction and have a same radius of curvature. The sealing portion 202 can be disposed between the edge portion 2013 and the first extended portion 2032 for reducing an area of the non-display region on the light emitting direction, thus screen-to-body ratio of the LCD panel 200 is increased and improved. The second extended portion 2033 is extended from another side of the support portion 2031. The second extended portion 2033 is parallel with the light emitting direction. Electronic elements 206 are disposed on a surface of the second extended portion 2033. The positions of the electronic elements 206 do not affect the screen-to-body ratio of the LCD panel 200. In one embodiment, the electronic elements 206 can include an integrated circuit, a chip on flex (COF), a resistor, or a capacitor, not being limited.

While various and preferred embodiments have been described the disclosure is not limited thereto. On the contrary, various modifications and similar arrangements (as would be apparent to those skilled in the art) are also intended to be covered. Therefore, the scope of the appended claims should be accorded the broadest interpretation so as to encompass all such modifications and similar arrangements.

What is claimed is:

1. A liquid crystal display (LCD) panel comprising:
   a first substrate with a display portion as a display region and at least two edge portions as a non-display region;
   a second substrate opposite to the first substrate;
   a liquid crystal layer disposed between the first substrate and the second substrate; and
   a plurality of electronic elements disposed on the second substrate;
   wherein the second substrate is a flexible substrate; the second substrate comprises a support portion, two first extended portions, and a second extended portion; the two opposite first extended portions having same shape in the non-display region and the second extended portion are extended from three adjacent edges of the support portion and are bent inward; the second extended portion is between the first extended portions; the bending directions of the first extended portions are opposite to each other, and are different from a bending direction of the second extended portion; the second extended portion is overlapped with the first extended portions and the support portion along a direction perpendicular to the display region; a size of the support portion is same as a size of the display portion; each first extended portion corresponds to one of the at least two edge portions; the second extended portion is extended from a side of the support portion and is bent to face away from the first substrate; a part of the second extended portion parallel with the second substrate is bent to be parallel with the support portion, and is disposed below the first substrate and the support portion; the electronic elements are spaced from the first substrate, and are disposed on a surface of the bent part of the second extended portion.

2. The LCD panel of claim 1, wherein the display portion and the support portion are curved structures; the display portion and the support portion are bent along a same direction and have a same radius of curvature.

3. The LCD panel of claim 1, wherein the display portion and the support portion are substantially in a plate shape.

4. The LCD panel of claim 3, wherein the first extended portions are extended from two opposite sides of the support portion facing the at least two edge portions; the at least two edge portions and the first extended portions are bent along a same direction and have a same radius of curvature.

5. The LCD panel of claim 3, wherein the second extended portion comprises a first bent portion and a second bent portion; the first bent portion is perpendicular to the support portion; the second bent portion is bent from an end of the first bent portion facing away from the support portion along a direction parallel with the support portion; the second bent portion is disposed below the support portion.

6. The LCD panel of claim 5, wherein the plurality of the electronic elements are disposed on a surface of the second bent portion facing away from the support portion.

7. The LCD panel of claim 1, wherein the LCD panel further comprises a sealing portion; the sealing portion surrounds the liquid crystal layer; the sealing portion seals and bonds the first substrate and the second substrate together.

8. The LCD panel of claim 7, wherein a partial portion of the sealing portion is disposed between the at least two edge portions and the corresponding first extended portions.

9. The LCD panel of claim 1, wherein the LCD panel further comprises a plurality of spacers; the plurality of spacers are disposed between the first substrate and the second substrate; the plurality of spacers support the first substrate.

10. The LCD panel of claim 9, wherein the plurality of spacers are arranged in a matrix.

* * * * *